United States Patent [19]

West

[11] Patent Number: 4,829,808
[45] Date of Patent: May 16, 1989

[54] FLOW METER PROVER APPARATUS AND METHOD

[76] Inventor: Theodore V. West, 15027 Sherman Way, Unit E, Van Nuys, Calif. 91405

[21] Appl. No.: 50,318

[22] Filed: May 15, 1987

[51] Int. Cl.⁴ ............................................. G01F 25/00
[52] U.S. Cl. ......................................................... 73/3
[58] Field of Search .......................... 73/3, 861.05, 239

[56] References Cited

U.S. PATENT DOCUMENTS

| Re. 31,432 | 11/1983 | Francisco, Jr. | 73/3 |
| Re. 32,157 | 5/1986 | Waugh et al. | 73/3 |
| 3,756,456 | 9/1973 | Georgi | 73/3 X |
| 3,768,510 | 10/1973 | Reves | 73/3 |
| 4,324,127 | 4/1982 | Gazzara et al. | 73/3 |
| 4,475,377 | 10/1984 | Halpine | 73/3 |
| 4,481,805 | 11/1984 | Dobesh | 73/3 |
| 4,549,426 | 10/1985 | Erickson | 73/3 |
| 4,627,267 | 12/1986 | Cohrs et al. | 73/3 |
| 4,637,244 | 1/1987 | Maurer et al. | 73/3 |
| 4,718,267 | 1/1988 | Capper | 73/3 |

FOREIGN PATENT DOCUMENTS

| 1498341 | 12/1968 | Fed. Rep. of Germany | 73/3 |
| 44929 | 3/1980 | Japan | 73/861.05 |
| 12512 | 2/1981 | Japan | 73/3 |
| 73024 | 4/1986 | Japan | 73/239 |
| 2088566 | 6/1982 | United Kingdom | 73/3 |
| 2129569 | 5/1984 | United Kingdom | 73/3 |

OTHER PUBLICATIONS

"Proving Liquid and Gas Flow Measuring Devices", Instrument and Control Systems; vol. 41, No. 4, pp. 133–136; Apr. 1968; E. L. Upp.

"Liquid Flowmeter Prover"; ISA Transactions; vol. 24, No. 3, pp. 83–91; pub. by Nov. 1985; P. A. Ward.

Primary Examiner—Tom Noland

[57] ABSTRACT

A prover to calibate flow meters is disclosed which includes a cylinder and by-pass valve in parallel flow paths, both in a series flow path with the meter to be proved. A piston is disposed to traverse the cylinder exiting the upstream end into an enlarged area while supported by an outrigger and exiting the downstream end into a second enlarged area while supported by a rod rigidly attached to the piston. The rod passes through a seal and bearing in the wall of the enlarged area and out into an auxiliary chamber which is floatingly mounted and can be controllably pressurized. The rod has marks, corresponding to a calibrated volume in the cylinder, which are detected by a detector. Included are provisions for ease of assembly, operation, and maintenance; for monitoring the cylinder-piston, the piston-rod, and the by-pass valve seals; and for proving meters to near-whole cycles.

27 Claims, 8 Drawing Sheets

FLOW METER PROVER APPARATUS AND METHOD

BACKGROUND OF THE INVENTION

1. Field of the invention

This invention relates to the proving of flow meters and to various improvements in the design, construction, and operation of meter provers.

Flow meters to be proved provide an output signal in relationship to the fluid flow. The output signal may be digital or analog. It is desirable to know the relationship of signal to flow as precisely as possible and this relationship changes over time. Therefore, it is desirable to calibrate or prove the meters to define the relationship between the output signal and the flow.

There are several ways to prove meters. The class of provers that this invention relates to are unidirectional compact provers. These provers all have an inlet, a cylindrical flow conduit some of which is a measuring section, a movable fluid barrier or piston, a valve, two detectors for detecting the piston when it is at each end of the measuring section and an outlet. The fluid flow path is through the meter, the inlet to the conduit, the cylindrical flow conduit with its measuring section, and, thence, out the outlet. The piston reciprocates upstream and downstream in the cylinder. In the upstream direction, the valve is open providing a path for the fluid flow. In the downstream direction, which is the prove stroke, the valve is closed and the piston moves with the fluid flow. The detectors signal when the piston enters and leaves the measuring section. This in conjunction with the output signal from the flow meter is input to a prover counter. The prover counter then calculates the correction factor for the meter.

In a separate activity, the prover is itself calibrated by a volumetric water measurement called water draw. During water draw the temperature and pressure of the water are noted. The volumetric water draw thus measured is corrected to a standard reference temperature and pressure both for the water and for the material of construction of the prover to obtain the water draw volume.

Prior art provers have design features which may contribute to inaccuracies in proving, may develop undetected leaks, and may cause seal leaks and other maintenance problems.

When provers are used to calibrate meters, the fluid temperature and pressure are noted and used to calculate volumetric corrections. These corrections are necessary because the actual prover volume will be different from the water draw volume if the actual temperature and pressure are different from the standard reference water draw temperature and pressure. However, these corrections are inaccurate to the extent that the assumptions of the calculations are inaccurate. For example, it is assumed that the measuring chamber has a uniform wall thickness and that it is unrestrained from expanding due to temperature or pressure increases. It is assumed that the walls of the measuring chamber are uniformly at the fluid temperature. For most of the provers in use, these assumptions are inaccurate to a greater or lesser degree. So, in practice the volumetric corrections are inaccurate.

An obvious solution to this problem is to have flow fluid inside and outside the measuring chamber and to keep the measuring chamber unrestrained from thermal expansion. This is known as double wall construction. Double wall construction has traditionally been used to maintain internal temperatures and to balance pressures. Numerous examples can be found in nature and in the continuum of human design from the earliest to the present. It is the application of this principle to the solution of specific problems that requires new art.

2. Prior Art

Howe U.S. Pat. No. 3,273,375, issued Sept. 20, 1966 discloses calibrating apparatus utilizing a double wall construction in which the measuring conduit is enclosed in an outer housing. An object of this type of construction is to substantially reduce stress and strain on the walls of the measuring chamber. However, Howe shows the measuring conduit supported by ribs along its length. These ribs transfer strain from the outer housing to the measuring conduit, distorting the measuring chamber and substantially reducing the benefit of the double wall construction. Further, the ribs prevent fluid contact at the outer surface of the measuring chamber and also transfer thermal energy from outside the apparatus to the measuring chamber. These conditions cause thermal distortions.

Francisco U.S. Pat. No. 3,492,856, issued Feb. 3, 1970 discloses a prover apparatus with an envelope forming an annular space, communicating with the flow fluid, around the measuring chamber. But, the cylinder is attached at the opposite end of the fluid conduit shell from the rod extension bearing and seal creating great difficulties in obtaining and maintaining alignment.

Waugh and Wehrli U.S. Pat. No. 4,372,147, issued Feb. 8, 1983 discloses a prover apparatus with a double wall construction similar to the Francisco apparatus except the measuring chamber is rigidly mounted to a blind flange at the rod extension bearing and seal or downstream end. In the Waugh design, it is necessary to provide a fluid barrier in the annular space between the cylinder and the outer housing. Waugh teaches that this can be done in a manner permitting free expansion of the measuring chamber, but, in practice, this has not been done because of conflicting needs to provide a double block and bleed seal and also to provide additional support at the outer end of the cylinder. This introduces all of the defects of the Howe and Francisco designs. There is thermal conduction and distortion. There is restraint against free radial expansion. There are serious alignment problems. There is insulation of the measuring chamber, from the fluid temperature, introducing strain and distortion.

Since the piston reciprocates in the cylinder and the flow through the meter cannot be stopped or reversed, there must be a provision for returning the piston after the prove stroke. This introduces many difficult problems. An alternate flow path must be established before the piston comes to rest at the end of the prove stroke, while the piston remains at rest, and while it is being returned upstream against the flow.

There is another class of compact prover, the bidirectional of which the Howe design, cited above, is a member which attempt to solve the problem by using a four-way by-pass valve, but this introduces more problems than it solves. Provers of this class simply reverse the flow through the fluid conduit so as a result the piston never has to be returned against the flow. Reversing the flow is done with a four-way valve. Besides being bulky, costly, and slow, these valves have a multitude of other problems such as short seal life and seals whose integrity is not easily verified. These provers tend to be large, expensive, and unreliable.

The Francisco design cited above and his U.S. Pat. No. 4,152,922, issued May 8, 1979, both disclose a design in which the piston has a poppet valve which opens at the end of the stroke and remains open while the piston is being pulled back upstream. There are several problems with using a poppet valve in the piston. To get a reasonable size flow path through the poppet valve it tends to be large in diameter making the piston large in diameter, and, thus making the prover large in diameter. Because it takes an interval of time for the poppet to close and to open, and because it must be closed when the detectors indicating each end of the measuring chamber are crossed, there must be an additional length on each end of the cylinder for the valve to open and close, thus making the prover longer. The poppet valve can be closed either with a spring or with differential pressure. Differential pressure is very undesirable when the poppet is closed during the prove stroke so, in practice, the valve is closed with a spring. But then it must be opened with differential pressure during the return stroke and this is undesirable also. Differential pressures across the prover cause flow disturbances which introduce inaccuracies into the meter proving.

The Waugh patent cited above discloses a design in which a by-pass valve is used to route the flow through a by-pass conduit when the cylinder is blocked by the piston. The by-pass valve is closed during the piston's downstream prove stroke and opened during the upstream return stroke. Provision must be made for flow continuation during the interval at each end of the stroke when the piston is stationary and the by-pass is closed. Waugh accomplishes this by providing a set of apertures beyond each end of the measuring section of the cylinder but inside the piston's limiting upstream and downstream positions. This not only adds considerable length to the cylinder, but also adds potential damage to the seals from riding over the apertures. Also it is costly to install apertures around the periphery of the cylinder.

In prover apparatus, it is highly desirable to approach zero differential pressure across the piston during the prove stroke to reduce flow perturbations at the very time flow is being measured. To try for zero differential piston pressure, there are three principle forces to balance. First is the force of friction on all sliding components. Second is the force of the flow fluid pressure acting on the differential area of the piston—effectively the pressure force on the rod end inside the prover. Third is the force of the control fluid pressure acting on the end of the rod outside the main conduit.

The Francisco design, cited above, discloses that during its prove stroke the rod is entering the prover. Thus the first and second forces act in concert to slow the piston down, thus again, the third force must balance both the first and the second force. This design is complicated by the fact that the rod end outside the prover has an auxiliary piston inside an auxiliary cylinder with one fluid resisting motion and the other aiding motion during the prove stroke. None of these forces are strictly constant and balancing them becomes a complicated act indeed. If the flow fluid pressure rises, the rod is in danger of failing as a column. Further, Francisco teaches that a differential pressure across the piston aiding in keeping the poppet valve closed is desirable.

The Francisco patent also disclosed a modification in which the piston rod extends out both ends of the prover. This effectively eliminates the second force but adds additional friction forces.

The Waugh design, cited above, discloses that during its prove stroke the rod is exiting the prover. Thus, the first and second forces act opposed. The third force, which in the Waugh apparatus is a singular pressure acting on the exterior end of the rod, therefore, must only balance the net of the first and second forces. The net of the first and second forces may resist or aid the motion of the piston during the prove stroke. If the net resists the motion of the piston, the third force, which, being pressure, can only act in compression, is unable to balance it. In that case an undesired differential pressure develops across the piston. If the net of the first and second forces aids the motion of the piston, then it-can be balanced by a control fluid, usually a hydraulic oil system.

Controlling the motion of a rod with controllable fluid pressure or flow is an old art. The means of that control may be new art. Waugh discloses two means of controlling the control fluid flow during the prove stroke. In one scheme Waugh regulates the flow of the control fluid in response to the flowing fluid pressure on the upstream side of the piston. In another scheme, Waugh regulates the flow of the control fluid in response to the differential pressure of the flowing fluid between the upstream and downstream sides of the piston. Both of these means require elaborate and expensive controllers which are subject to error and failure.

These methods for controlling piston motion are quite complicated. The first two forces acting on the piston are constant except during a brief moment at each end of the stroke when it is outside the measuring chamber anyway. During the prove stroke, in the measuring chamber, the friction is virtually constant and the fluid flow pressure is nearly constant. Therefore, the control pressure need only be constant if it is correct.

The systems in which provers are used run between two extremes in regard to their flow-pressure relationship: hard systems and soft systems. In hard systems, large differential pressures across the prover result in very small flow rate changes. In soft systems, a small differential pressure across the prover results in a large flow rate change. In both systems, the piston should move downstream in compliance with the flow during the prove stroke. Since achieving perfection is difficult, there will usually be a small differential pressure across the piston. In a hard system, if the controlling fluid is not compliant, that is, pressure controlled, the tendency of the piston to match its speed to that of the flow fluid may be resisted, the differential pressure may rise, and a flow disturbance may result. In a soft system, if the controlling fluid is not resistant, that is, flow controlled, the tendency of the piston to accelerate because of the differential pressure will be accommodated and the piston will change speed, unrestrained by the fluid flow, and will cause a flow disturbance. None of the prior art accommodated this.

In addition, prior art provers of the type disclosed by Waugh, followed the natural tendency of making the piston rod as small as possible, consistent with not failing as a column. But, this meant that in low pressure systems, the second force could never be large enough to balance the first force and so the controlling fluid, able to only act in compression, could not control.

Means must also be included in compact provers for stopping the piston at the end of the prove stroke. At high flows the speed is considerable and the piston, particularly with the rod attached, as a significant amount of kinetic energy. If the piston is stopped at the end without consideration for an interval of deceleration it will be subject to damage and will emit objectional noise. The Howe apparatus employs rods projecting from the center of both ends of the outer housing to stop the piston motion. The Francisco apparatus discloses a portion of the poppet valve associated with the piston assembly which is designed to directly contact the downstream end of the cylinder to operate the poppet valve. These prior art apparatus rely on unyielding metal to metal contact to stop the piston. The Waugh apparatus discloses a third set of apertures provided in the conduit downstream of the second set of apertures, whereby, when the piston covers the third set of apertures, the fluid within the conduit smoothly decelerates the piston motion. These holes are fixed and cannot be adjusted to meet changing conditions. Again, holes of this type are costly, can cause seal breakdown both from a grating action and from hydraulic action when the seals are forced outward against the apertures from pressures and flow at high rates of energy absorbtion.

During the prove stroke, if there is any fluid leakage between the upstream and downstream sides of the prover, the calibration will be inaccurate to the extent of the leakage. The Francisco apparatus has no method of testing for leakage during operation, but, rather requires that the flow through the apparatus be stopped and a lengthy testing procedure be followed. It is hoary art in this field to employ two seals with a space between that can be drained to demonstrate no leakage conditions. This is called a double block and bleed system. There are many valves in the trade that employ this principle. Most cylinders with pistons employ the double block principle. Francisco's U.S. Pat. No. 3,492,856 does so. Shepherd et.al U.K. Patent Application G.B. No. 2,088,566A filed Nov. 28, 1980, shows double block piston seals with an annular space between, he also teaches, in one embodiment, the rod is hollow to provide communication from the space between the seals to a pressure sensor carried on the end of the rod so as to provide a means of monitoring the efficacy of the seals while the piston is in the cylinder. Pfrehm GB Patent Specification No. 1,275,639 published May 24, 1982, also shows double block piston seals, with an annular space between. The Waugh patent discloses the double block piston seals, an annular cavity formed between the seals, a passage connecting the cavity to one end of a flexible tube, and means for connecting the other end of the flexible tube to the exterior of the apparatus, whereby the integrity of the piston seals may be continuously monitored from the output of the flexible tube while the piston is stationary or in motion. Waugh also teaches that the integrity of the seals on the by-pass valve may be similarly monitored. In practice these seals are monitored by opening the passage from the space between the seals so that the space between the seals freely communicates with space outside the prover. Flow fluid from between the seals is drained or blown off thus reducing the pressure between the seals. The passage is then closed and the pressure is monitored to indicate any leakage past the seal. This procedure can be manual or automatic, both are used. This procedure creates several problems. Some flow fluid is wasted or must be recycled and recovered. Unless precautions are taken, some flow fluid escapes to atmosphere which practice is often undesirable. In high pressure fluid flow systems, a large differential pressure can be created between the flow conduit and annular space between the seals which can either damage the seals or, for seals which tighten with increased differential pressure, may lock the seals against the inside of the cylinder impeding piston motion. Separate tests are always performed on the piston seals and the by-pass valve seals which require additional time. The seal between the rod and the piston, which is hidden from testing, does not get an integrity check although it is desirable to do so.

In proving, the volume displaced by the piston stroke must be measured. The Francisco U.S. Pat. No. 3,492,856 Feb. 3, 1970 discloses means for indicating the angular displacement of the drum which is related back to the displacement of the piston through a cable. There are many accuracy and seal problems with an angular detector and cable.

The Pfrehm et al prover, the Francisco U.S. Pat. No. 4,152,922 prover, and the Waugh apparatus all disclose two detectors in a spaced apart relationship where the distance between the first and second detection means corresponds to the length of the fluid measuring portion of the conduit, and with only one characteristic on the piston or rod being detectable. If either of the detectors should fail and be replaced the distance between the detectors can change significantly, requiring a new water draw. It is also known in the art to use a photoelectric cell to detect indicia.

The detectors used are various. Magnetic limit switches, photocells, induction devices are some examples. They each have either an accuracy or reliability problem or require a complex support system.

The Shepherd et al patent discloses a method of proving in which the meter signals define the start and stop of the prove stroke, the object being to prove the meter over integral numbers of meter revolutions. It has long been known that this was desirable since the meter flow-to-signal relationship is not constant over a revolution of the meter. Shepherd also discloses a meter prover in which a part attached to the rod cooperates with an encoder to provide signals denoting increments of movement of the piston. This prover is very difficult to carry out in practice because some awkward means, of the type Shephard shows in his drawings, must be found to control the piston. Thus, such a prover seems impractical.

All prior art provers are constructed with one or more pipe flanges used to connect the fluid flow conduit. The prover must be disassembled to gain access for maintenance, and for other reasons. There are numerous problems associated with these flanges including that they are assembled with numerous fasteners requiring prolonged labor to assemble and disassemble.

All unidirectional compact provers have a rod or cable extending from the end of the outer housing or flow conduit. Because of the means of construction there is excessive bearing wear and seal failures. Typical means of construction is to mount the control fluid pressure chamber rigidly to the outer housing of the flow conduit. This then requires the accurate alignment of three widely spaced points on a welded structure which is very difficult at best.

For all compact unidirectional provers that have a rod or cable extending from one end, the quantity of fluid taken in differs from the quantity of fluid put out during the prove stroke because of the displacement of the rod or cable. Most flow systems in which a prover is used, have a flow restricting means as well as the meter and a pump or other flow inducing means. The flow restricting means, for example, might be a flow control, a partially closed valve, an orifice plate, or just a long run of pipe.

It is arbitrary practice to install the meter on one side of the prover and the flow restricting means on the other side of the prover. During the prove stroke, since the pressure at the flow restricting means will change very little, the flow rate through the flow restricting means will change very little. The meter meanwhile will simply follow whatever flow there is. Since the volume of flow that enters the prover is not the same as the volume of flow that exits the prover, the meter will speed up or slow down during the prove stroke; there will be a flow disturbance. Since disturbances can cause measuring error, this method of arranging the piping system is very undesirable.

In prior art provers the prover is always mounted with the prover axis horizontal. Some provers have been developed that can be tipped up and down between a vertical and a horizontal orientation, but this requires a very large support. Sometimes horizontal orientation is desirable to keep a low center of gravity. Keeping the downward projected area small is always desirable but the present methods of mounting present a large downward projected area.

SUMMARY OF THE INVENTION

This invention has inlet and outlet conduits attached entering and leaving the outer housing. The outer housing is the fluid conduit that contains the cylinder. The cylinder is held and sealed in the outer housing at the downstream end. The cylinder annular seals are the double-block-and-bleed type. The cylinder is compressionally clamped at the upstream end by clamps that allow the cylinder to radially-self-align. The annular space around the cylinder, communicating with the fluid flow, balances the pressure on all sides of the cylinder and provides a thermally insulating layer. The double wall construction along with this method of clamping and sealing leaves the cylinder completely free of contact and stresses, over the entire length of the measuring chamber, caused by sealing and clamping. A moveable fluid barrier for example a piston traverses the cylinder during prover operation. At the end of the prove stroke, on the downstream end, it leaves the cylinder entirely and is held in proximal alignment by the closeness of the bearing in the downstream end. On the upstream end the piston also leaves the cylinder and is held in alignment by an outrigger support attached to the piston or rod. This design automatically allows flow at each end of the stroke without poppet valves or apertures in the cylinder. It allows the shortest, simplest cylinder.

The piston is attached to a rod, the outermost end of which is in an auxiliary controllable pressure chamber. The flow in and out of this chamber and the pressure in the chamber are controlled by a hydraulic system.

The hydraulic system has components to control the downstream motion of the piston either by controlling the flow out of the chamber or by controlling the pressure in the chamber.

Thus a flow control component is provided for soft fluid flow systems, and a pressure regulator component is provided for hard fluid flow systems. This arrangement provides all of the control required, keeping the hydraulic system simple and inexpensive yet effective.

In another aspect of the system, the piston rod diameter is sized larger than required by strength considerations to insure that in low pressure fluid flow systems, there is sufficient cross sectional area for the pressure to operate on to allow the fluid flow pressure force to overcome the resistance of friction and allow a compressive force on the control fluid so that it can control the motion of the rod during the prove stroke.

The outermost end of the auxiliary controllable pressure chamber is fitted with an adjustable shock absorber which makes contact with the outermost end of the piston rod near the end of the prove stroke, decelerating it over an interval of time and distance. This is a simple and inexpensive means of providing this highly desirable function.

The piston is provided with two seals on the outer diameter which seal against the cylinder. The piston is also provided with two seals in its bore which seal against the rod. The by-pass valve is also of the double-block-and-bleed type with two seals. The space between each of these two seals forms a chamber. Conduits are provided to join all of these chambers to one side of a differential pressure switch the other side of which connects to the flow fluid through the outer housing of the prover. A volume changing means is provided which connects to the spaces between the several seals. At the beginning of the prove stroke, as soon as the piston enters the measuring chamber, the volume changing means expands reducing the pressure in the leak check system and activating the differential pressure switch. During the prove stroke if any of the seals leak the differential pressure drops deactivating the differential switch. If the seals do not leak the switch remains activated. The switch is accordingly monitored at the beginning of the measuring chamber and at the end of the measuring chamber. Obviously the seals can be so checked singly or in any combination.

In another aspect of the invention the differential pressure switch is mounted on the piston and the signal is transmitted out of the prover.

The piston rod is fabricated of a magnetic material with a low coefficient of thermal expansion such as Carpenter's Invar (Reg. T.M.). In one aspect the rod is solid. In another aspect the rod has a centrally located axial passage to conduct the leak check signal to the outside of the outer housing. In one aspect the rod has magnetically detectable characteristics for example, two grooves perpendicular to the axis of the rod in a spaced apart relationship where the distance between the first and second groove corresponds to the length of the fluid measuring portion of the conduit. In another aspect the rod has a multitude of equally spaced detectable characteristics for example, grooves across a longitudinal line on the surface of the rod. The rod is smoothly coated, filling the grooves, with a magnetically transparent material such as chromium.

Either edge of the groove is the characteristic that is being detected by the detector to determine the start or finish of a calibrated volume of displacement by the piston. Usually either two leading edges or two trailing edges will be used to define the displaced volume. Attached fixedly to the outer housing in close proximity to the rod is a mounting means, of non-magnetic material, for the single detector. The detector is an active magnetic pick-off device based on the Hall effect. The detector is tilted slightly from perpendicular to the rod axis to overcome its neutral signal tendency when held perpendicular.

Using one detector instead of two allows replacing the detector in case of failure without re-water drawing. The active magnetic pick-off changes state from high to low or from low to high with as little as 0.0001 inch movement between the detector and the groove edge, it is thus extremely accurate, it is of simple geometric shape, easy to mount, it is intrinsically safe in an explosive environment, requires only simple external circuitry, is moderately priced, and is precise without a precision spacing from the rod. It thus is a solution to many of the detector problems plaguing prior art provers. In manufacturing, detectors of this type are adjusted (trimmed) so that they are highly sensitive to an edge of magnetic material. As a result their signal is ambiguously high or low when held square with the rod surface. It is therefore necessary to tilt or cock them slightly to make them definitely high or low when the detector is between grooves.

If the design is of the aspect with a multiple of equally spaced grooves, then a meter can be proved in such a manner as to have near integral revolutions of the meter. This can be a great advantage, especially with oval gear meters, because the relationship of the flow to the signal output is not constant over a revolution of the meter.

The outer housing is provided with a quick-opening closure on the end opposite the rod to allow ease of maintenance. When the piston protrudes from the upstream end of the cylinder, both seals may be removed without removing the piston from the rod.

This arrangement combined with the quick opening closure, makes seal changing easily manageable by one man. Provers are usually multi-ton devices operating in remote areas and ease of maintenance is an important consideration.

The piston is attached to a rod which extends through bearing and seal out of the outer housing. The rod end exterior of the outer housing passes through seals into an auxiliary pressure chamber. Within that chamber the rod has an anti rotation means and the rod end has a bearing means. The auxiliary pressure chamber is mounted free to rotate a small amount about two mutually perpendicular axis each of which is perpendicular to the axis of the chamber. The mounting of the chamber also allows the chamber to move small amounts in two mutually perpendicular directions each of which is perpendicular to the axis of the chamber. The weight of the chamber assembly is counter balanced.

Mounting and supporting the auxiliary pressure chamber in this way allows it to float in all degrees of freedom important to alignment. There is two point alignment in the outer housing and two point alignment in the pressure chamber. The two points in the pressure chamber can float with respect to the two points in the outer housing. This drastically reduces the radial loads on the seals and bearing and reduces the shear and bending moments on the rod.

Between the inlet connection and the outer housing, the inlet conduit connects to a by-pass conduit containing the by-pass valve and connecting to the outlet conduit between the outer housing and the outlet connection.

In one aspect of the invention the prover axis is mounted horizontally and in another aspect it is mounted vertically. The vertical aspect presents a desirable small downward projected area. In some cases a low center of gravity is important, in other cases a small downward projected area is important.

The prover is installed in the flow system with the meter and the flow restricting means on the same side, either upstream or downstream, of the prover. This method prevents the meter from speeding up or slowing down during the prove stroke, which prevention is desirable.

DESCRIPTION OF THE PREFERRED EMBODIMENT

Figure 1:
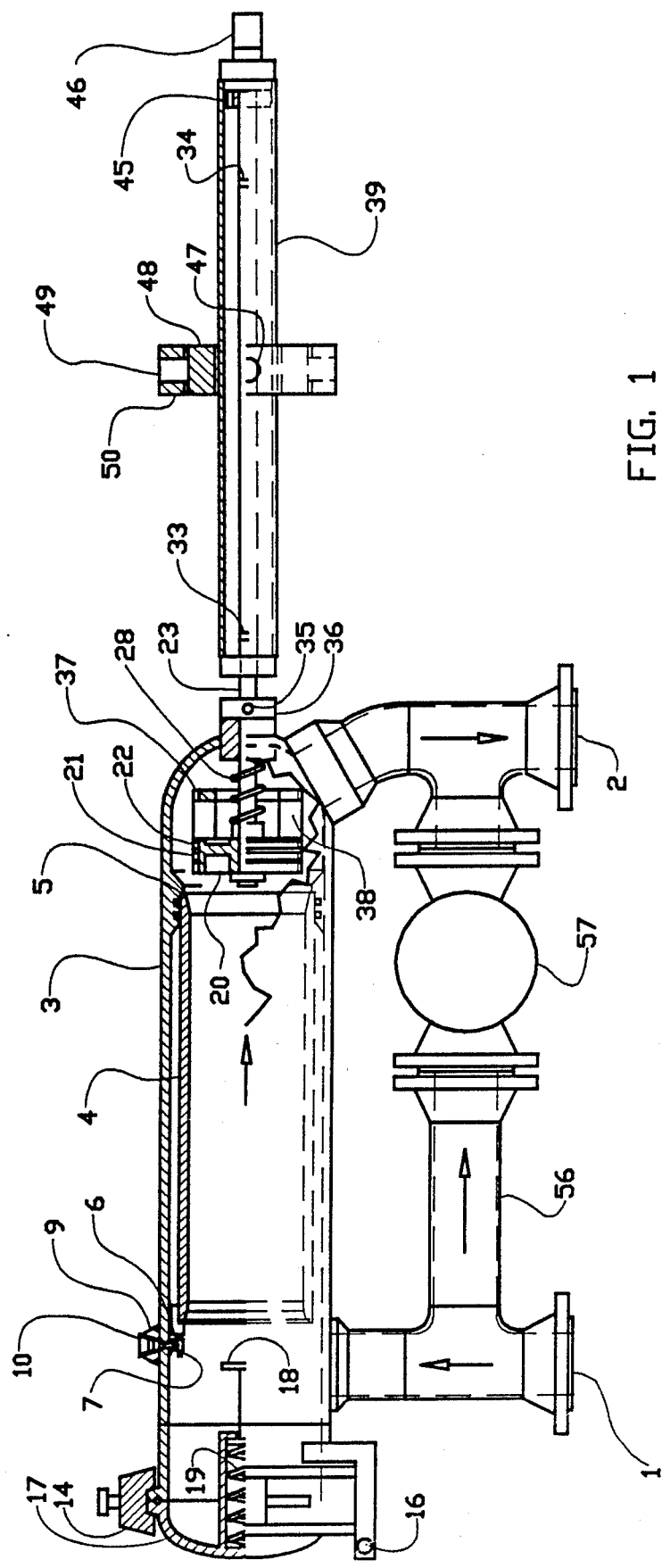
FIG. 1 is a partial plan representation of the invention.
Figure 2:
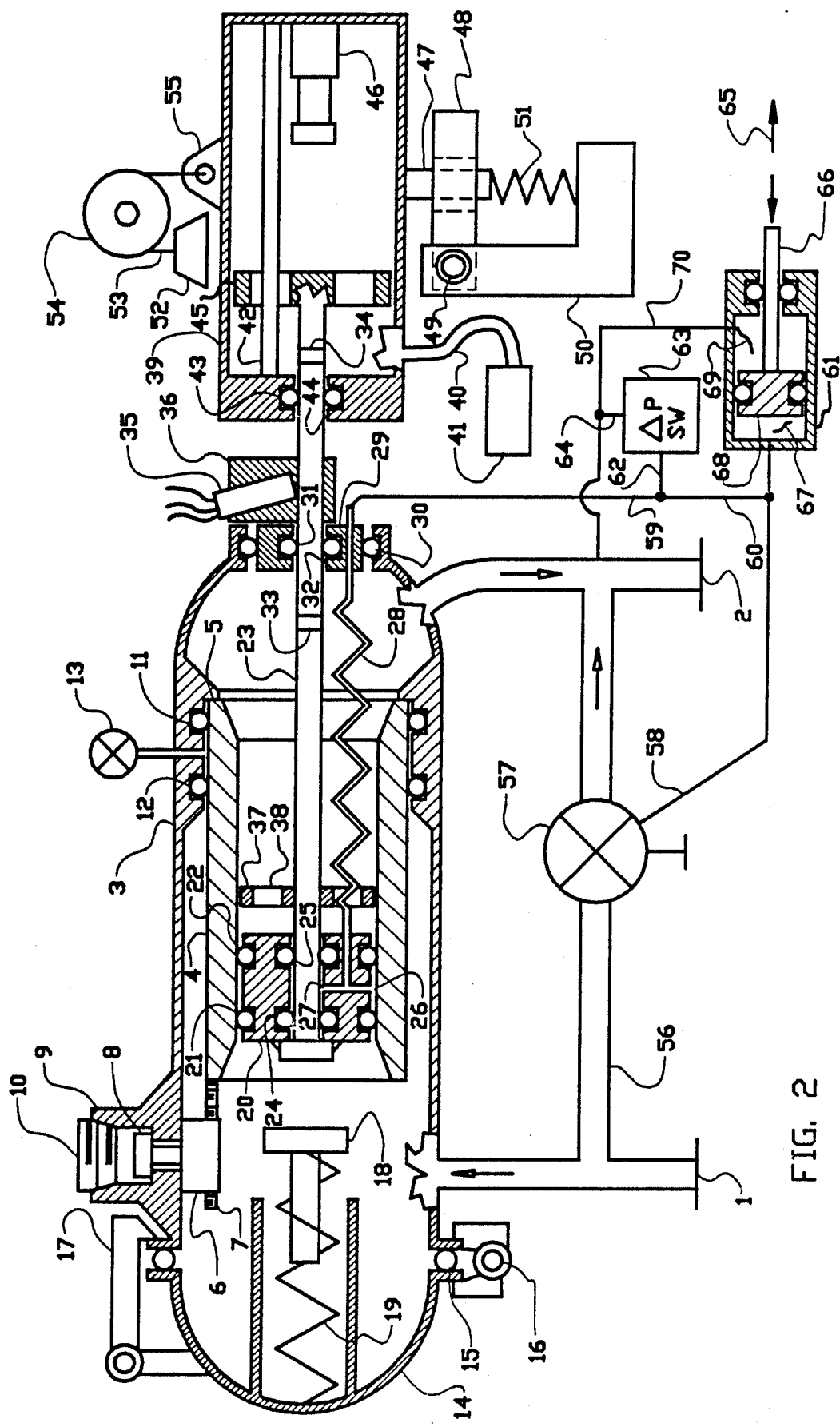
FIG. 2 is a schematic version of FIG. 1.

Referring to FIGS. 1 and 2 there are shown two plan representations of the prover. FIG. 1 is a representation of a given model. FIG. 2 is a schematic depiction to clarify the ideas. There is an inlet 1 and an outlet 2 attached to the outer housing 3. The cylinder 4 is squared and located at the upstream end in the seat 5. It is clamped at the downstream end by the clamp block 6 and clamp screw 7. The clamp block is held in place by screw 8 which is inside weldolet 9 kept from leaking by plug 10. A plurality of clamps are used.

Near to where the cylinder is seated there are two block-and-bleed annular seals 11 and 12. The annular space thus formed can be bled through valve 13.

At the upstream end, the outer housing 3 has a quick opening closure 14, sealed with seal 15. The closure pivots about hinge 16 and is held closed with clamp 17. Mounted on the closure is launch plunger 18 propelled by launch spring 19.

The piston 20 reciprocates through cylinder 4. It is slidably sealed against the cylinder 4 with seals 21 and 22. It is sealed against the rod 23 with seals 24 and 25. These seals form annular double-block-and-bleed spaces 26 and 27, which is conducted outside the prover through flexible tube 28. The conduit for tube 28 passes through cylindrical block 29 which is removable for servicing the tube 28. The block 29 is sealed on the outside against the outer housing 3 with seal 30 and against the rod 23, with seal 31. The block 29 has an inner bearing surface 32 against rod 23.

The rod contains two grooves 33 and 34, the edges of which are detected by detector 35. The detector 35 is mounted angularly in non-magnetic block 36.

Mounted on the rod 23 or on piston 20 is an outrigger 37, with flow holes 38, which supports the piston 20 and rod 23 end when the piston 20 is at the furthest upstream end of its stroke and is protruding from the cylinder 4.

The outermost end of rod 23 extends out of the outer housing 3 and into an auxiliary controllable pressure chamber 39, which is pressurized through conduit 40 by hydraulic system 41. The pressure chamber 39 has a non-rotation device 42, is slidably sealed against the rod 23 with seals 43, and has bearing surface 44 against rod 23. The end of the rod 23 has a bearing surface 45 against the inside of the chamber 39. The outermost end of the chamber 39 is fitted with a shock absorber 46 to gently stop the motion of the rod 23. The chamber 39 is supported by trunion pin 47 which is free to rotate and slide in block 48. Projecting from block 48 is trunion pin 49 which is free to rotate and slide in block 50. The weight of the components in the chamber 39 is counterbalanced by the spring 51 or the counter weight 52 hung by cord 53 around pulley 54. Cord 53 is attached to chamber 39 at eye 55. Between inlet 1 and outlet 2, parallel to outer housing 3 is by-pass line 56, containing by-pass valve 57. Valve 57 is the block-and-bleed type with leak check conduit 58 joining piston seal leak check conduit 59 and joining conduit 60 from volume changing means 61 to conduit 62 leading to one side of the differential pressure switch 63. The other side of differential pressure switch 63 joins to the fluid flow reference pressure through conduit 64. Volume changing means 61 requires only a small force 65 on rod 66 because the pressure 67 on the blind side, of the piston 68 is mostly balanced by the pressure 69 on the rod side of the piston 68 by the reference conduit line 70.

Figure 3:
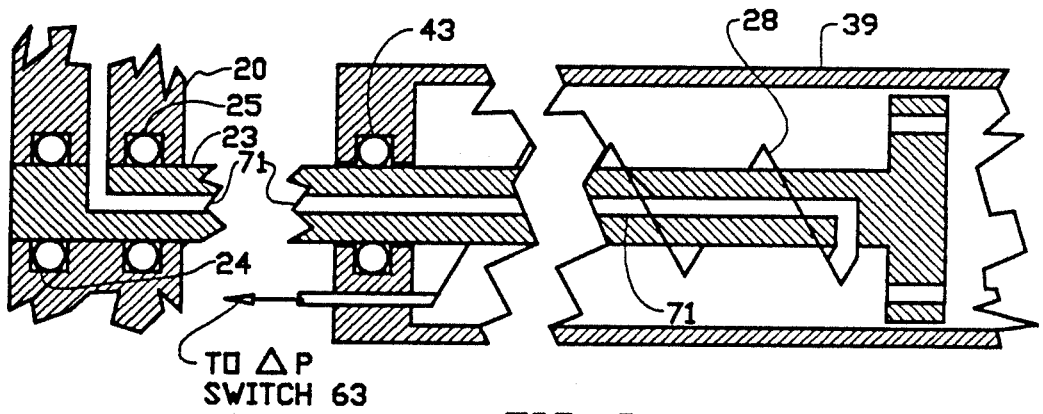
FIG. 3 is a schematic representation of the hollow rod used to transmit the leak check signal.

FIG. 3 shows an alternate means of conducting the leak check signal from the piston 20 through the seals 24 and 25 via a hollow conduit 71 through rod 23 into the auxiliary pressure chamber 39 and out through flexible tube 28 to the differential pressure switch 63.

Figure 4:
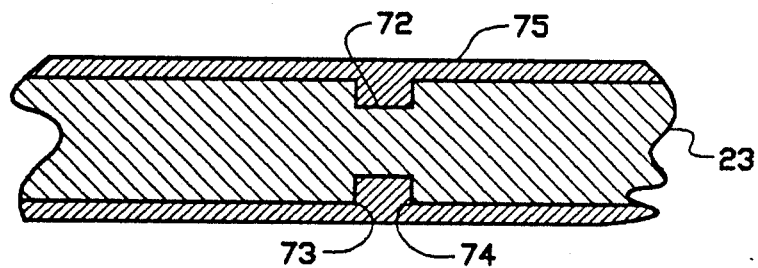
FIG. 4 shows the rod with the groove to be detected by the detector.

FIG. 4 shows the rod 23 with the groove 72 which is detected by detector 35 at corners 73 or 74. Rod 23 is preferably made of magnetic material with a low coefficient of thermal expansion such as Carpenter's Invar (registered trademark). The groove is filled with a magnetically transparent material such as chromium 75. In practice the groove 72 need only be 0.004 or 0.005 inches deep and 0.100 inches long. The chromium 75 coating on the remainder of the rod is usually only 0.0001 to 0.0015 inches deep. The groove 72 may be only a short slot on one side of the rod 23.

Figure 5:
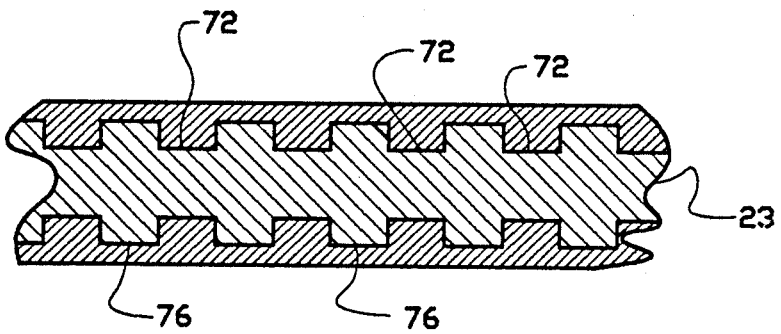
FIG. 5 shows the rod with a plurality of grooves to be detected by the detector.

FIG. 5 shows the rod 23 with multiple, equally spaced grooves 72. The grooves may be short slots, circumferential slots, or helical thread-like slots. The land 76 between the grooves 72 does not have to be the same length as the grooves 72

Figure 6:
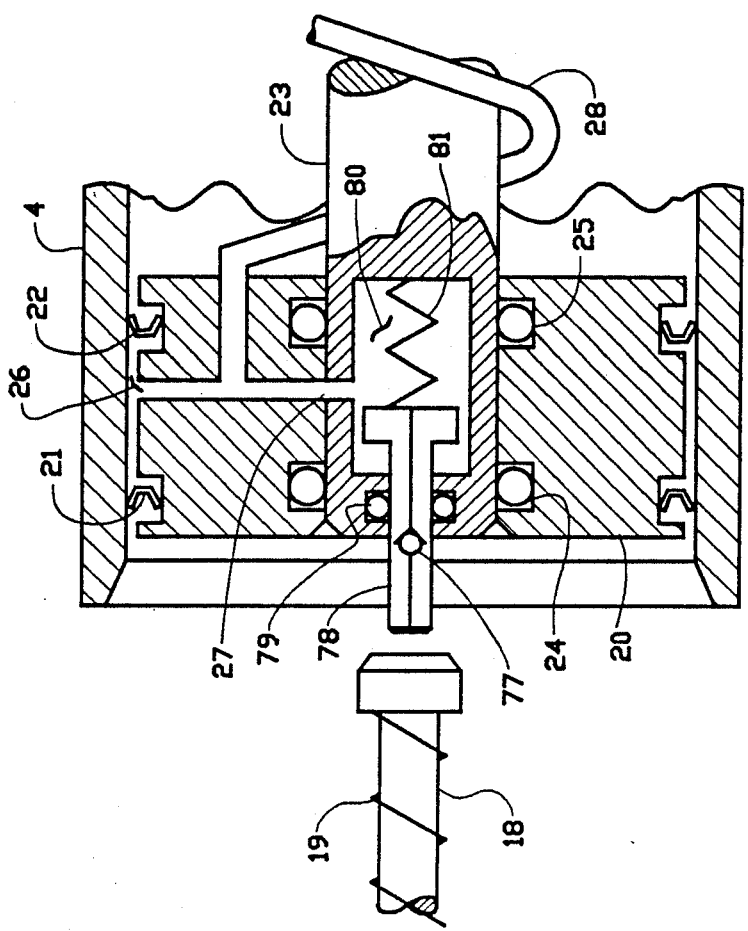
FIG. 6 shows a cross-section of the piston in the cylinder end with volume changing means.

FIG. 6 shows a schematic sectional view of the piston 20 in the upstream end of the cylinder 4 depicting another volume changing means for the leak check system. Check valve 77 is contained in plunger 78 which is slidably sealed in the end of rod 23 by seal 79. Spring 81 applies force to the back of plunger 78 tending to push it out of chamber 80. The device works as follows: When the rod 23 and the piston 20 are traveling upstream, near the end of the stroke plunger 78 contacts launch plunger 18. Launch spring 19 easily overcomes spring 81 pushing plunger 78 back into chamber 80, displacing the volume of fluid taken up by that part of the plunger 78 which enters chamber 80. The displaced fluid is forced out over check valve 77. When the prove stroke is launched, seals 21 and 22 are both sealing against the inside of cylinder 4 before the launch plunger 18 takes its leave of the piston 20. As the piston 20 pulls away from launch plunger 18, spring 81 begins pushing plunger 78 out of chamber 80 reducing the pressure in chamber 80 and, consequently in annular chambers 26 and 27 and also in flexible tube 28 which transmits it to the differential pressure switch 63.

Figure 7:
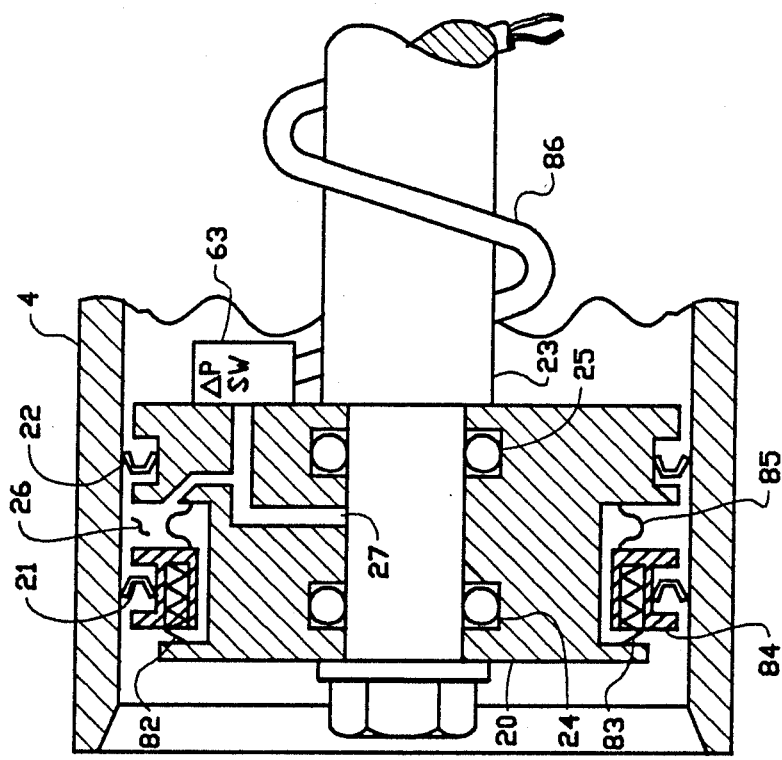
FIG. 7 is similar to FIG. 6 showing a different volume changing means and with the leak check differential pressure switch mounted on the piston.

FIG. 7 shows a schematic sectional view of the piston 20 in the upstream end of the cylinder 4 depicting yet another volume changing means for the leak check system. This FIG. 7 also depicts attaching the differential pressure switch 63 to the piston 20 inside the prover instead of outside and transmitting an electrical signal out along flexible cord 86 instead of a pressure signal out along flexible tube 28. Spring 82 and 83 tend to force ring 84 downstream tending to reduce the volume of annular chamber 26 which is sealed by flexible diaphragm 85 and piston seals 21 and 22. The device works as follows: When the piston 20 is being pushed upstream by rod 23, the friction on seal 21 and the springs 82 and 83 all tend to hold the ring 84 downstream and all tend to reduce the volume in chamber 26. When the piston 20 exits the cylinder 4 the springs 82 and 83 move the ring downstream. When the piston 20 has exited the cylinder 4, annular chamber 26 is fully exposed to the fluid flow. When the prove stroke is launched, seal 22 enters cylinder 4 first. When the seal 21 outer lip touches cylinder 4, the volume in chamber 26 is at its minimum. The friction force of seal 21 on the inside of cylinder 4 tends to hold the ring 84 at the entry of the cylinder 4, as the piston 20 continues downstream, easily overcoming the force of springs 82 and 83. As seal 21 seals off the chamber and continues to be dragged back the pressure is lowered in chamber 26 and consequently in chamber 27. This lowered pressure is transmitted to differential pressure switch 63 and is transmitted out of the prover via flexible cord 86 as an electrical signal. Differential pressure switch 63 could also be a differential pressure transmitter without altering the invention.

Figure 8:
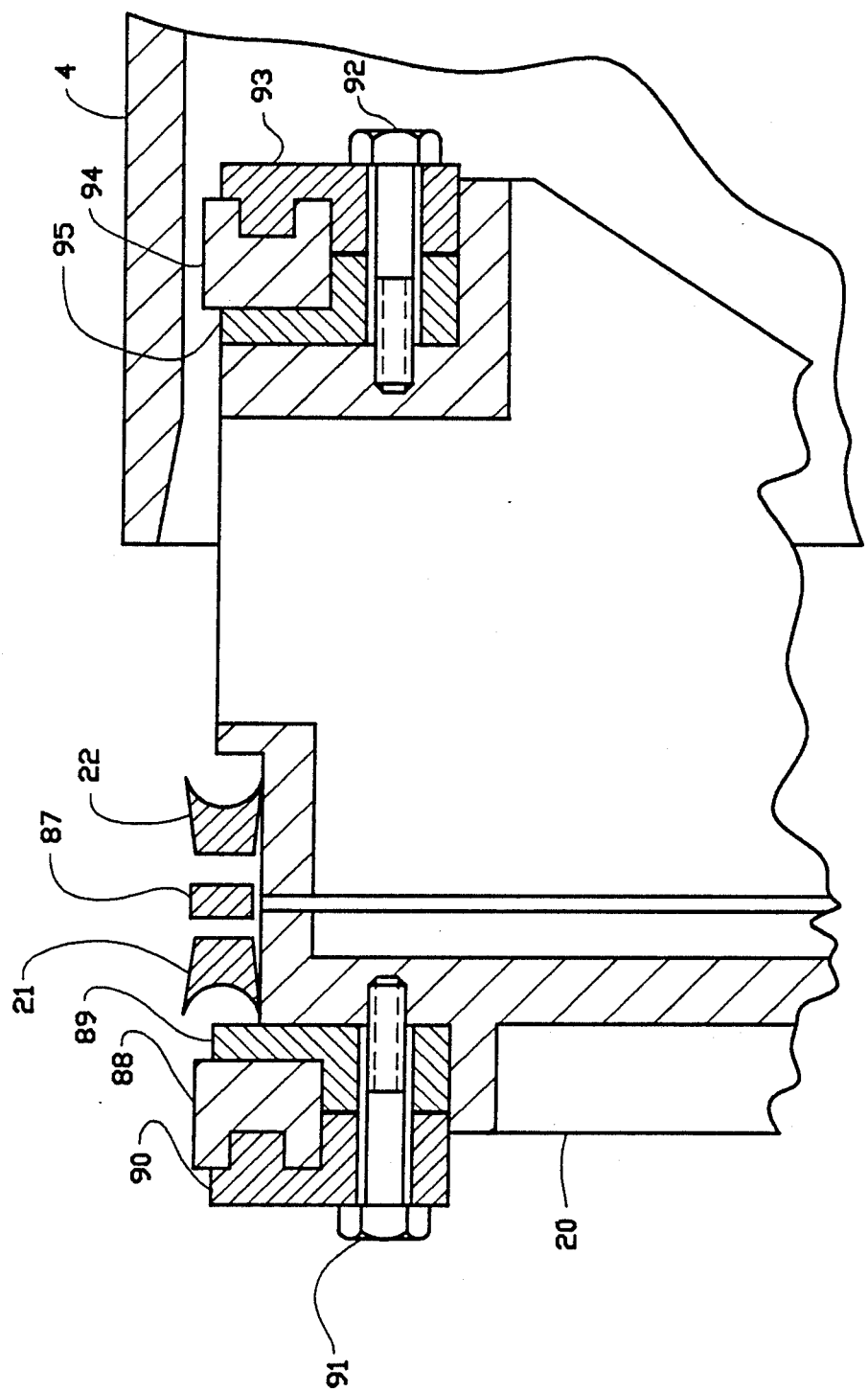
FIG. 8 shows the piston extending out of the upstream end of the cylinder depicting the means for changing the seals from the end.

FIG. 8 shows a cross-sectional view of the top portion of the piston 20 fully extended on the upstream end out of cylinder 4 depicting the ease of changing seals 21 and 22. Ring 87 is a spacer between seals 21 and 22. Rings 88 and 94 are wear rings with a low coefficient of friction against the inside of cylinder 4 and having other good bearing properties. Rings 89, 90, 93 and 95 are retaining rings. Screws 91 and 92 hold the assemblies together. It is evident that the seals may be removed by removing screw 91, pulling off rings 90, 88 and 89. Seal 21 may then be slipped off. Spacer ring 87 may then be slid off gaining access to seal 22 which may then be removed.

Figure 10:
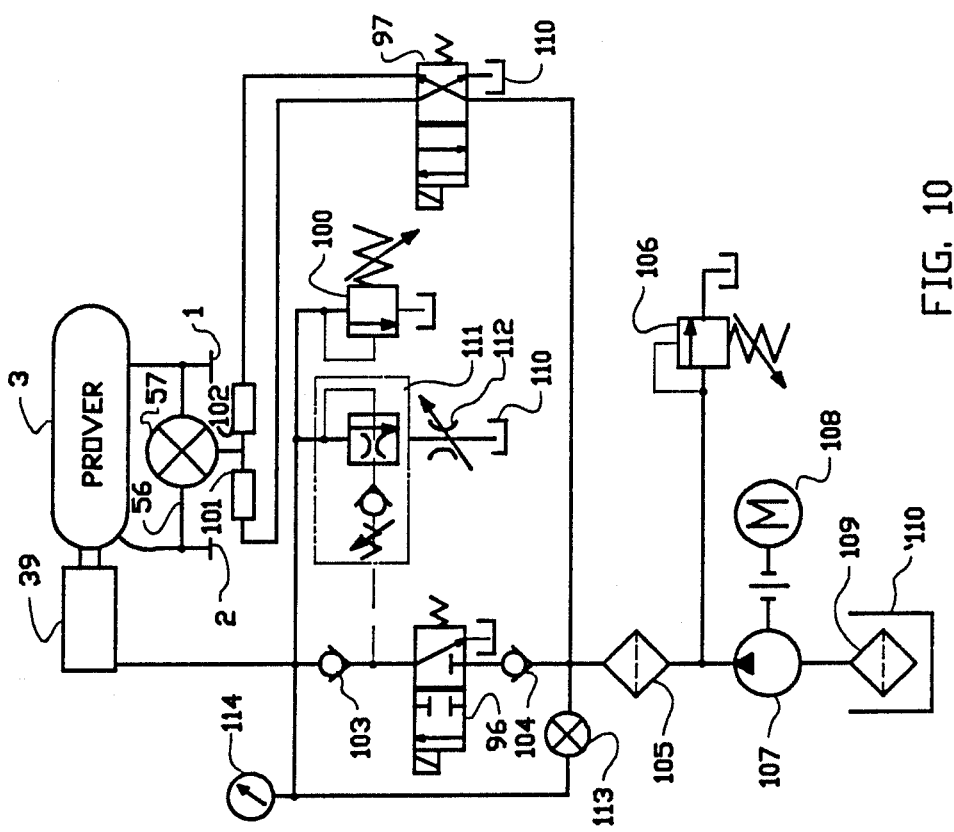
FIG. 10 is a schematic of another hydraulic system.
Figure 9:
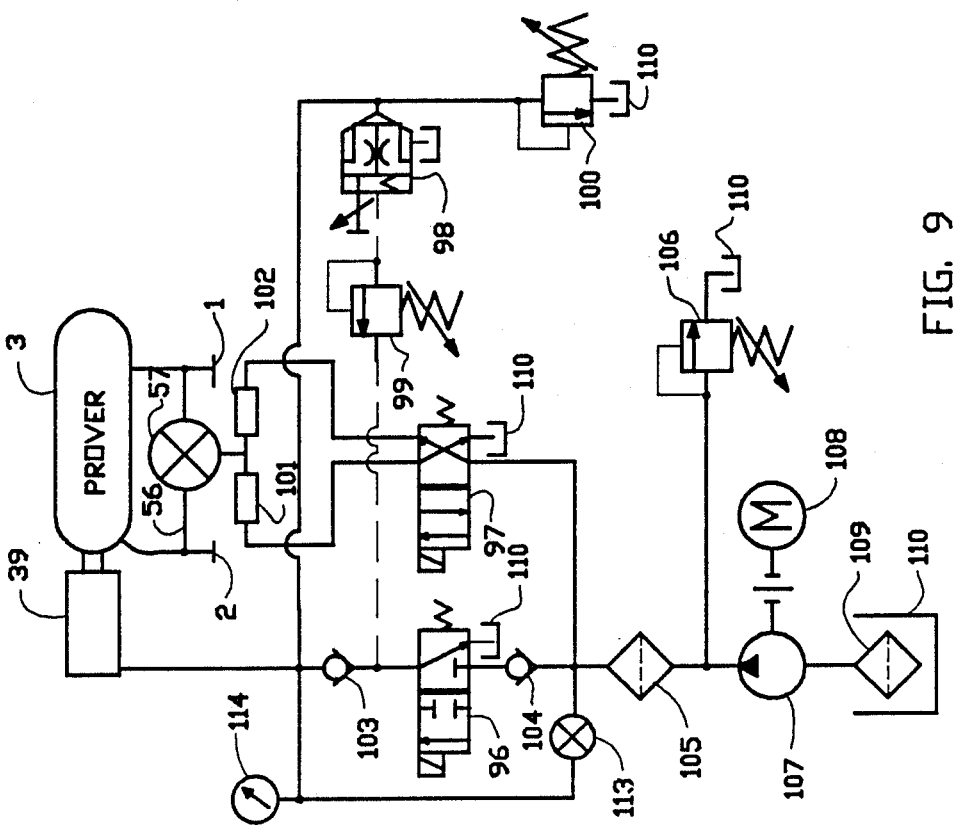
FIG. 9 is a schematic of the hydraulic system.

FIGS. 9 and 10 show two versions of a hydraulic system schematic. The motion of the piston in prover outer housing 3 is controlled by the controllable pressure in auxiliary pressure chamber 39. Flow through the by-pass valve 57 and in by-pass line 56 between inlet 1 and outlet 2 is controlled by opening the by-pass valve 57 with valve actuator 102 or closing the valve 57 with valve actuator 101. Solenoid operated two-way valve 96 controls the fluid flow in a start-stop way to the chamber 39. Check valves 103 and 104 allow flow from the pump 107 to the chamber 39 but not in the opposite direction. Pressure regulator valve 99 (FIG. 9) controls the pressure on the control side of logic valve 98 (FIG. 9) which in turn, controls the pressure in chamber 39 during the prove stroke. Valve 99 can be set from zero to maximum safe pressure of chamber 39. Logic valve 98 (FIG. 9) may also be set as a variable calibrated orifice, thus operating as a flow control valve, controlling the flow from chamber 39 during the prove stroke. Pressure regulator valve 111 (FIG. 10) directly controls the pressure in chamber 39; it too, can be set from zero to maximum safe pressure of chamber 39. Flow control valve 112, (FIG. 10) controls the flow from chamber 39 during the prove stroke. Solenoid operated four-way valve 97 controls the flow to the by-pass valve actuators 101 and 102. Valve 113 is an on-off valve. Gauge 114 is a pressure gauge Pressure relief 100 is used as a safety valve preventing chamber 39 from becoming over-pressurized. Filters 105 and 109 keep the system clean. Pump 107 is operated by motor 108. Tank 110 is the fluid reservoir. Pressure relief 106 controls the system pressure. The hydraulic system works as follows: The pump pressurizes the system to the pressure set on valve 106, excess fluid flows over valve 106 to tank 110. With valves 96 and 97 as shown, the prover piston is downstream and the by-pass valve 57 is open. The pressure on valve 99 (FIG. 9) and on valve 111 (FIG. 10) may be pre-set without operating the prover by opening valve 113 and adjusting valves 99 (FIG. 9) and 111 (FIG. 10) to the correct pressure shown on gauge 114. The correct pressure balances the fluid pressure in the prover less the pressure compensation of friction forces. Valve 113 is then closed. Solenoid valve 96 is activated shifting the flow of fluid into the chamber 39 causing the piston to move upstream. When the detector has detected both marks and a few seconds have elapsed, the piston is all the way upstream. Control pressure flow out of valves 99 (FIG. 9) and 111 (FIG. 10) is blocked through valve 96 which blocks the main flow through valves 98 (FIG. 9) and 111 (FIG. 10). Solenoid valve 97 is activated, closing by-pass valve 57. Check valve 104 prevents the high pressure in chamber 39 from back-flow to provide the, normally, low pressure flow required to close the by-pass valve 57. Solenoid valve 96 is deactivated allowing the control fluid from valves 99 (FIG. 9) and 111 (FIG. 10) to flow to tank, starting the prove stroke. Check valve 103 prevents the high pressure from chamber 39 back-feeding to the control side of valves 99 (FIG. 9) and 111 (FIG. 10). During the prove stroke, the prover with chamber 39 will act as a pressure intensifier if the fluid is not drained from chamber 39 at the proper rate. Thus, if something goes haywire, valve 100 will relieve excess pressure, if everything is O.K., valve 100 remains inert. During the prove stroke, the fluid can be drained from chamber 39 with either one of two methods of control. In a hard fluid flow system, the stop on valve 98 (FIG. 9) and the valve 112 (FIG. 10) will be adjusted all the way open and the valves 99 (FIG. 9) and 111 (FIG. 10) will be adjusted to control the pressure in chamber 39 allowing the piston to float downstream at the speed of the flow fluid. In a soft fluid flow system, the pressure control on valves 99 (FIG. 9) and 111 (FIG. 10) will be adjusted to zero and the flow through valves 98 (FIG. 9) and 112 (FIG. 10) will be adjusted to control the flow of fluid from chamber 39, allowing the piston to move downstream at the speed of the flow fluid. After the detector detects two marks and a period of time has elapsed, valve 97 will be deactivated opening the by-pass valve 57 and, thus, returning the prover to its starting position.

Figure 11:
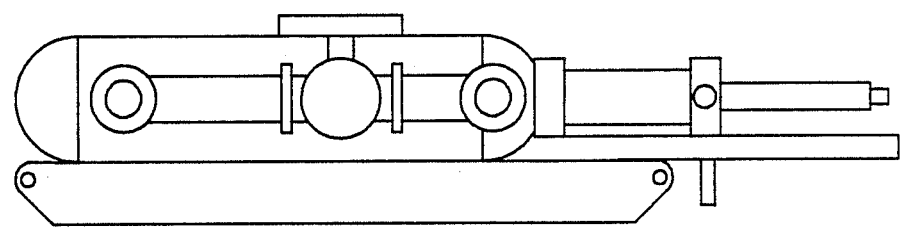
FIG. 11 is a side view of the prover mounted in a horizontal aspect.

FIG. 11 shows the prover in its horizontal aspect.

Figure 12:
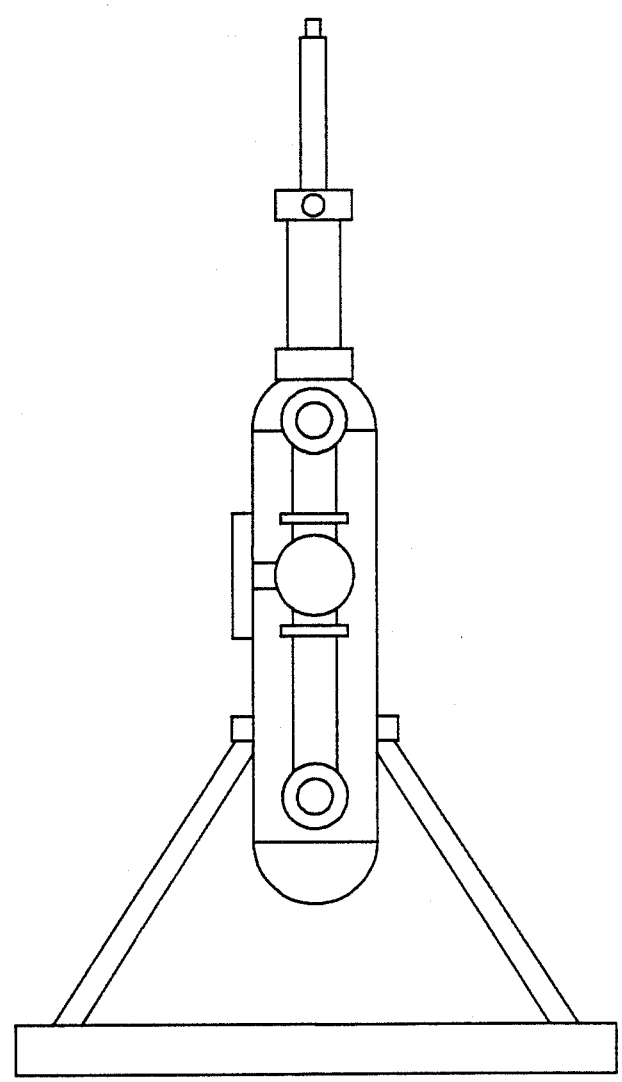
FIG. 12 is a side view of the prover mounted in a vertical aspect.

FIG. 12 shows the prover in its vertical aspect.

Figure 13:
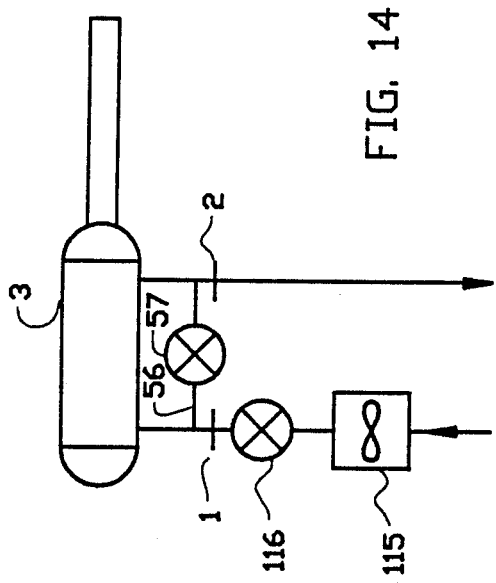
FIG. 13 is a schematic of the prover installed in a flow system showing one arrangement of the components.

FIG. 13 shows the prover in a schematic flow system. Meter 115 is a pulse producing meter. Symbol 116 represents a flow restricting means which may be a flow control or regulator, a valve of many types, an orifice plate, a long run of pipe, or any other means to produce the system's major pressure drop. The flow producing means such as a pump may be anyplace upstream or downstream of the system shown. The key to having the prover system work well is to have the meter and the flow restricting means in either order on the same, upstream or downstream side of the prover.

Figure 14:
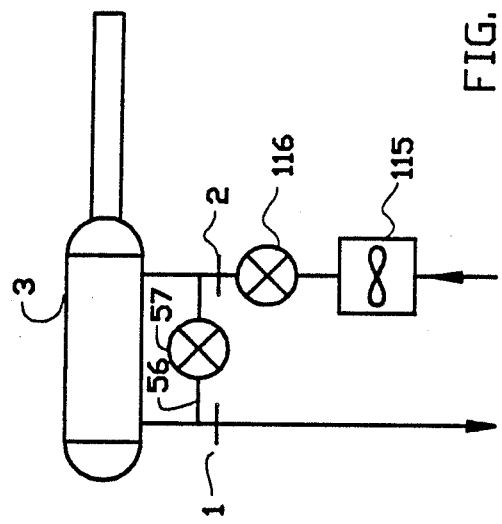
FIG. 14 is a schematic of the prover installed in a flow system showing another arrangement of the components.
Figure 15:
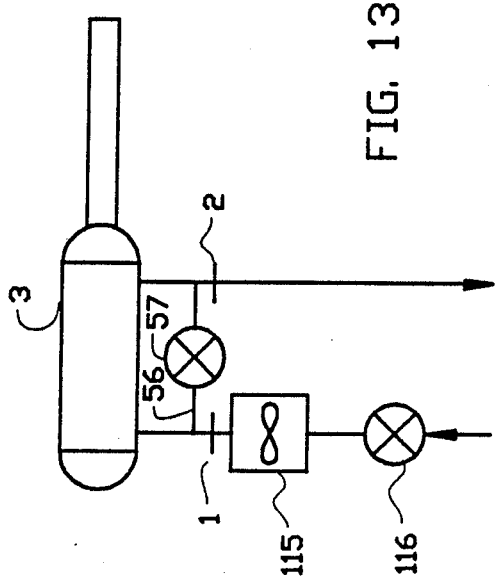
FIG. 15 is a schematic of the prover installed in a flow system showing yet another arrangement of the components.
Figure 16:
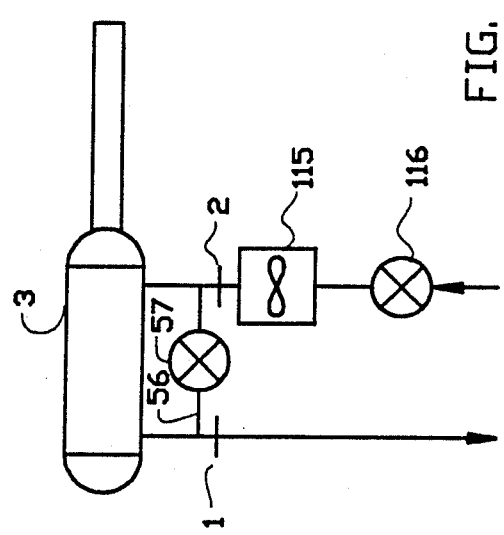
FIG. 16 is a schematic of the prover installed in a flow system showing yet another arrangement of the components.

FIGS. 14, 15 and 16 show the other alternatives in which the prove system will work well.

I claim:

1. A proving system with a cylindrical measuring chamber with a fluid barrier disposed to move within the measuring chamber, said fluid barrier having two seals against the inside of the measuring chamber sealing portions of the measuring chamber on opposite sides of the fluid barrier from each other, and wherein a first annular volume formed by a space directly between the seals is changed and monitored.

2. A proving system according to claim 1 which has a cylindrical rod disposed to move with the fluid barrier, the rod passing through the fluid barrier and being mechanically attached to the fluid barrier, the rod being sealed to the fluid barrier with two seals forming a second annular volume which is joined to the first annular volume.

3. A proving system according to claim 1 or 2 which employs a valve which has a double seal forming a volume which is joined to the first annular volume.

4. A proving system according to claim 1 or 2 which employs a volume changing means to change the volume which is to be changed and monitored, and said volume changing means is a second cylinder with a slidably disposed piston sealed to the inside of the second cylinder.

5. A proving system according to claim 1 or 2 which employs a volume changing means to change the volume which is to be changed and monitored, and said volume changing means is a second cylinder with a slidably disposed plunger sealed to the inside of the second cylinder.

6. A proving system according to claim 1 or 2 which employs a volume changing means to change the volume which is to be changed and monitored and said volume changing means is a diaphragm.

7. A proving system according to claim 1 or 2 which employs a volume changing means to change the volume which is to be changed and monitored, said volume changing means is employed to induce a pressure change in the volume which is to be changed and monitored and said pressure change is monitored by a pressure switch.

8. A proving system according to claim 1 or 2 which employs a volume changing means to change the volume which is to be changed and monitored, said volume changing means is employed to induce a pressure change in the volume which is to be changed and monitored and said pressure change is monitored by a differential pressure switch.

9. A proving system according to claim 1 in which measuring chamber and the fluid barrier are contained in an outer housing; and which employs a volume changing means to change the volume which is to be changed and monitored, said volume changing means is employed to induce a pressure change in the volume which is to be changed and monitored and such pressure change is monitored by a device which is mounted inside the outer housing.

10. A proving system according to claim 1 in which the measuring chamber and the fluid barrier are contained in an outer housing; and which employs a volume changing means to change the volume which is to be changed and monitored, said volume changing means is employed to induce a pressure change in the volume which is to be changed and monitored and such pressure change is monitored by a device which is mounted outside the outer housing.

11. A proving system according to claim 10 in which the pressure change is transmitted by a flexible tube to the inside of a removable plug in the outer housing and the pressure change is transmitted to the outside through a hole in the removable plug.

12. A proving system according to claim 1, in which the cylindrical measuring chamber is a portion of a conduit pipe open on both ends and contained in an outer housing; the conduit pipe being secured to the outer housing and sealed to the outer housing in such a way that there is no securing or sealing in the measuring chamber portion of the conduit pipe.

13. A proving system according to claim 1, in which said two seals move with the movable fluid barrier, the measuring chamber having an open end, the moveable fluid barrier having a rod attached to it extending from one side, the moveable fluid barrier being provided with outrigger shoes to slide on the inside of the measuring chamber cylinder extending on the same side as the rod, the moveable fluid barrier being provided with means to extend it beyond the open end of the measuring chamber where it is supported by the outrigger shoes in a manner allowing the sealing means to be changed without detaching the rod from the moveable fluid barrier.

14. A proving system according to claim 1, in which the moveable fluid barrier is provided with a rod, said rod extending into an auxiliary pressure chamber, said rod having an axis, said rod being provided with means to prevent rotation about its axis.

15. A proving system with a cylindrical measuring chamber with a fluid barrier disposed to slide within the measuring chamber, an outer housing with an inlet and an outlet, a moveable fluid barrier slidably sealed with two spaced seals adjacent to the inside of the measuring chamber, a rod attached to the moveable barrier penetrating the outer housing, the rod sealed to the outer housing so that it can slide inwardly and outwardly, said sliding inducing a friction force, a pressure inside the outer housing tending to force the rod outwardly, the cross-sectional area of said rod being designed so that the outwardly acting pressure force is always equal to or greater than the sliding induced friction force, and wherein an annular volume formed by the space directly between said two spaced seals is changed and monitored.

16. A proving system according to claim 15, in which said rod extends into an auxiliary pressure chamber, said rod having an axis, said rod being provided with means to prevent rotation about its axis.

17. A proving system with a cylindrical measuring chamber with a fluid barrier disposed to slide within the measuring chamber, an outer housing with an inlet and an outlet, a moveable barrier slidably sealed with two spaced seals adjacent to the inside of the measuring chamber, a rod attached to the moveable barrier penetrating the outer housing, the rod sealed to the outer housing so that it can slide outwardly and inwardly, the rod end exterior to the outer housing being disposed in an auxiliary pressure chamber, said auxiliary pressure chamber not rigidly attached to the outer housing, and wherein an annular volume formed by the space directly between said two spaced seals is changed and monitored.

18. A proving system according to claim 15 or 17, in which the cylindrical measuring chamber is a portion of a conduit pipe open at both ends and contained in the outer housing; the conduit pipe being secured to the outer housing and sealed to the outer housing in such a way that there is no securing or sealing in the measuring chamber portion of the conduit pipe.

19. A proving system according to claim 15 or 17, in which said two seals move with the movable fluid barrier, the measuring chamber having an open end, said rod extending from one side of the movable fluid barrier, the movable fluid barrier being provided with outrigger shoes to slide in the side of the measuring chamber cylinder extending on the same side as the rod, the movable fluid barrier being provided with means to extend it beyond the open end of the measuring chamber where it is supported by the outrigger shoes in a manner allowing the sealing means to be changed without detaching the rod from the movable fluid barrier.

20. A proving system according to claim 17 in which the rod has an axis and in which the auxiliary pressure chamber has a first axis substantially in line with the rod's axis; said auxiliary pressure chamber being floatingly mounted to allow lateral motion perpendicular to its first axis and to allow rotary motion about axes perpendicular to its first axis, and in which the weight of said auxiliary chamber is counter balanced.

21. A proving system according to claim 17 is which the auxiliary pressure chamber is provided with a shock absorber to dissipate the kinetic energy of the rod and moveable flow barrier assembly near the end of outwardly slidable motion.

22. A proving system according to any claim 17, 20, or 21 in which the rod and moveable flow barrier assembly have two support zones at the outer housing and two support zones at the auxiliary pressure chamber, said two support zones at said auxiliary pressure chamber being disposed to move in a relieving response to any bending or shearing forces on the rod.

23. A proving system according to any claim 17, 20, or 21 in which there is pressure in and there is flow of a control fluid in and out of said auxiliary pressure chamber and in which pressure in the auxiliary pressure chamber and flow of a control fluid in and out of said auxiliary pressure chamber is controlled by a system of hydraulics in which flow into the auxiliary pressure chamber is provided by a pump whose output pressure is controlled by a first pressure regulator and in which flow out of the auxiliary pressure chamber is manually selectably controlled by either a flow control or by a second pressure regulator, both said flow control and second pressure regulator are manually settable to a desired level; the auxiliary pressure chamber being additionally provided with a safety pressure relief; whether flow of the control fluid is in or out of the auxiliary pressure chamber being determined by the position of a solenoid activated four-way valve which is also provided as part of the system.

24. A proving system according to any claims 17, 20, or 21 in which the auxiliary pressure chamber is provided with a means of controlling the amount of pressure in said auxiliary pressure chamber and the amount of flow out of said auxiliary pressure chamber is such a way that an operator may manually select either (a) primarily controlling the amount of pressure so as to keep it substantially constant during an outward slide of the rod while at the same time allowing the flow out of said auxiliary pressure chamber to vary or (b) primarily controlling the amount of flow out so as to keep it substantially constant during an outward slide of the rod while at the same time allowing the pressure in said auxiliary pressure chamber to vary.

25. A proving system according to claim 24 in which the auxiliary pressure chamber is provided with a pressurizing means, a pressure indicating gage, a solenoid activated four-way valve which alternately connects the auxiliary pressure chamber to the pressurizing means or to the means of controlling the amount of pressure in said auxiliary pressure chamber and the amount of flow out of said auxiliary pressure chamber and a second manually controlled valve connected to by-pass and the four-way valve and connect the pressurizing means directly to the means of controlling the amount of pressure in said auxiliary pressure chamber and the amount of flow out of said auxiliary pressure chamber.

26. A proving system according to claim 17 in which the rod has an axis and in which the auxiliary pressure chamber has a first axis substantially in line with the rod's axis; the auxiliary pressure chamber is provided with first trunions with a second axis perpendicular to the auxiliary pressure chambers first axis, the auxiliary pressure chamber being free to slide along and pivot about the second axis; the first trunions being disposed to be received by a first frame in which they can pivot and slide, the first frame being provided with second trunions with a third axis perpendicular to said first axis and perpendicular to said second axis, the first frame and thus auxiliary pressure chamber being free to slide along and pivot about the third axis, the second trunions being disposed to be received by a second frame in which they can pivot and slide, the second frame being attached to a support, said support being in a fixed relationship to the measuring chamber, the weight of the auxiliary pressure chamber being provided with counter balancing means.

27. A proving system according to claim 17, in which the rod is provided with means to prevent rotation about an axis thereof.

* * * * *